C. W. DAVIS.
JUNCTION BOX FOR ELECTRICAL CABLES.
APPLICATION FILED FEB. 24, 1909.

1,061,527.

Patented May 13, 1913.
3 SHEETS—SHEET 1.

WITNESSES:
J. Herbert Bradley
Charles Barnett

INVENTOR
Charles W. Davis
by Christy and Christy
Atty's

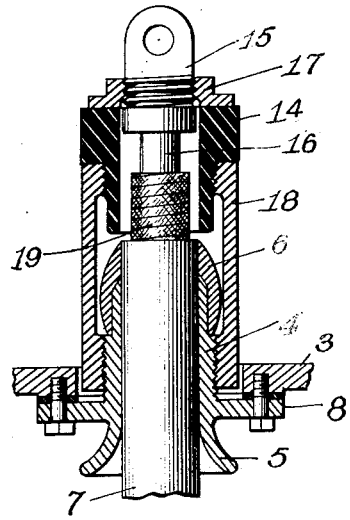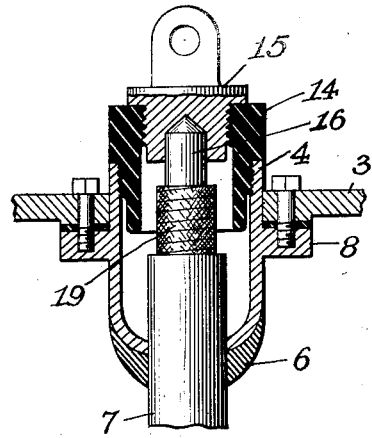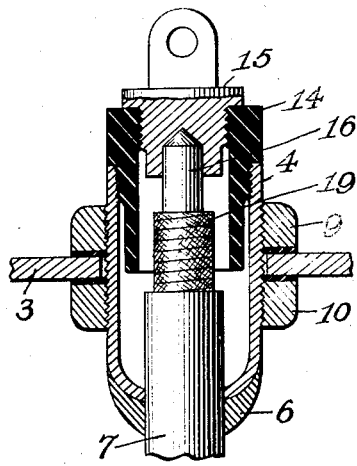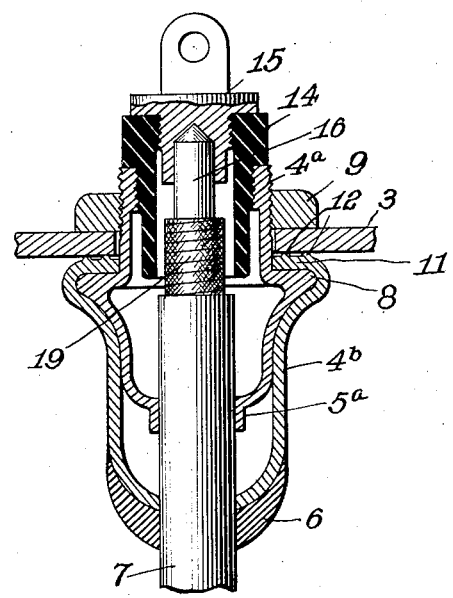

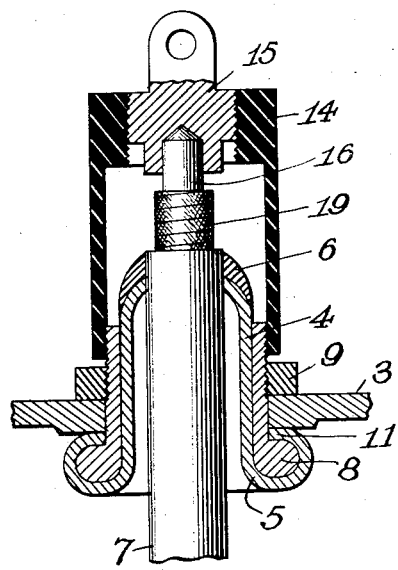
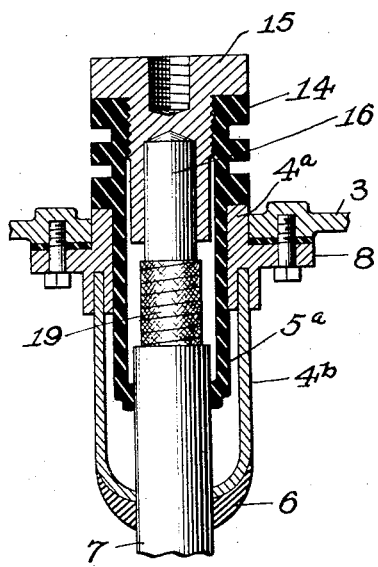
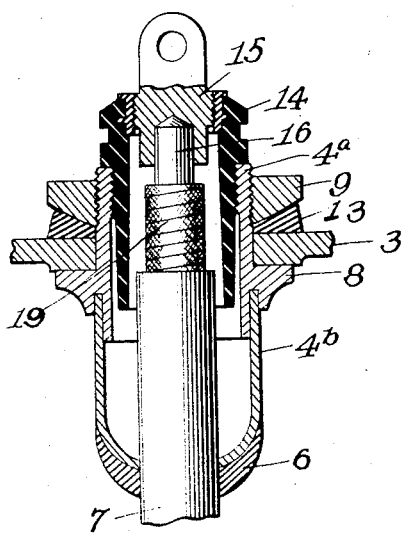
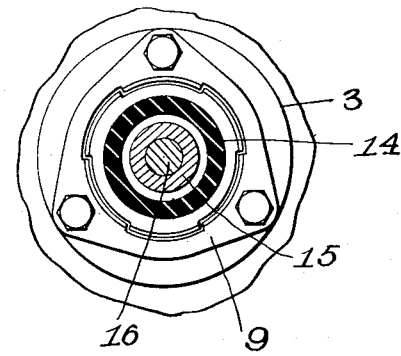

UNITED STATES PATENT OFFICE.

CHARLES W. DAVIS, OF EDGEWORTH, PENNSYLVANIA, ASSIGNOR TO STANDARD UNDERGROUND CABLE COMPANY, OF PITTSBURGH, PENNSYLVANIA, A CORPORATION OF PENNSYLVANIA.

JUNCTION-BOX FOR ELECTRICAL CABLES.

1,061,527. Specification of Letters Patent. Patented May 13, 1913.

Application filed February 24, 1909. Serial No. 479,769.

*To all whom it may concern:*

Be it known that I, CHARLES W. DAVIS, residing at Edgeworth, in the county of Allegheny and State of Pennsylvania, a citizen of the United States, have invented or discovered a certain new and useful Improvement in Junction-Boxes for Electrical Cables, of which improvement the following is a specification.

My present invention is directed to a structure commonly termed a junction box, which is merely a casing within which conductors which form the cores of electrical cables are connected one with another. Such a structure has its most usual application in underground installations of electrical equipment, although it is not limited to underground application. The first essential in such constructions is to insulate and protect the connection, to the prevention of leakage and loss of current, and another requisite is the protection of the constituent parts of the organized cable from deterioration. To this end the structures must be protected particularly from the ingress of water. Secondary to these fundamental requirements, it is most desirable that the arrangement of junction boxes shall be such that they may be readily got at and their contents available for purposes of repair and change, as the conditions of the installation may require.

Figure 1:
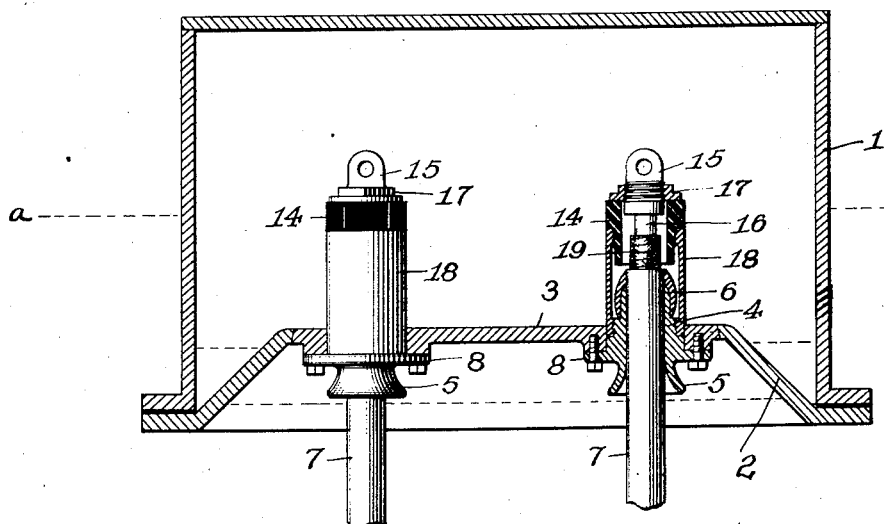
Figure 2:
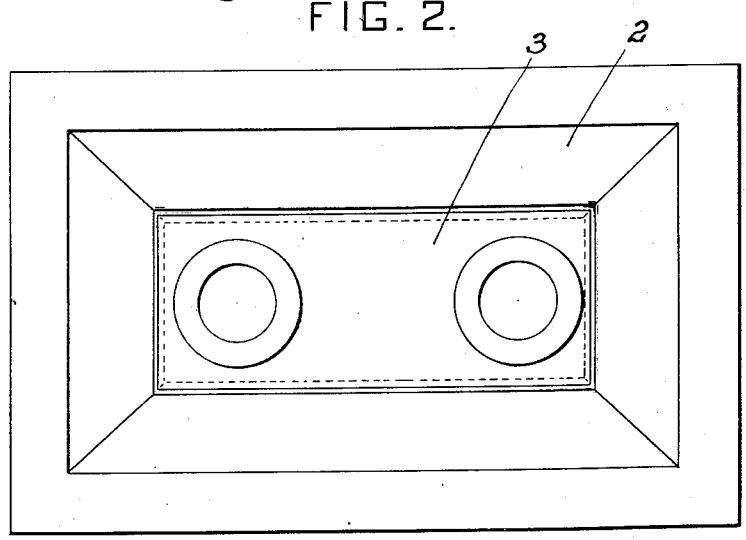
Figure 3:
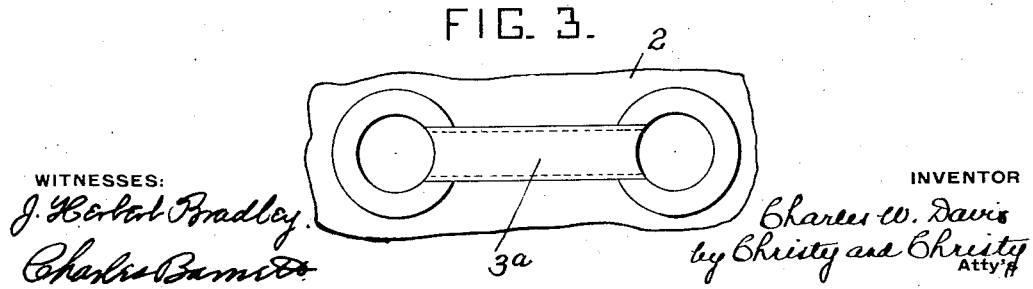

In the accompanying drawings, which form part of this specification, Figure 1 shows in vertical section a junction box embodying my present invention; Fig. 2 is a plan view of the bottom of this box; Fig. 3 is a plan view of a fragment of the bottom of a box, illustrating a modification in detail of a feature shown in preferred form in Figs. 1 and 2; Fig. 4 shows in vertical section and on larger scale the terminal structure which is set in the wall of the junction box, and through which a cable is introduced to the chamber within the box. Figs. 5, 6, 7, 8, 9, and 10 are like views to Fig. 4, illustrating certain modifications in detail of what is there shown; Fig. 11 is a plan view of a structure of Fig. 10 with a slight modification which is described in the specification.

The feature of my present invention which I shall describe first is one which adapts my junction box peculiarly to underground conditions. For example, a junction box which is installed in a manhole beneath the pavement of a street may be subject to not only the dripping of condensed moisture, but it may be actually inundated by water rising and filling the manhole space.

Referring now to Fig. 1, I will first direct attention to a feature which peculiarly adapts it to underground service. Instead of forming the junction box as has heretofore been done, with a substantially level base extending in a single plane, on which the hood or cover rests to inclose a chamber within which the cable connections are made, I employ a base plate, 2, which is dished, that is, shaped with a depending peripheral flange and an elevated portion within or intermediate of the peripheral flange. The lid, 1, which I employ, is made water tight and fits down over the upwardly dished base plate and engages the depending flange at the periphery of the base plate. The introduction of the cables into the chamber within the junction box is in this case preferably made through that portion of the dished base plate which is elevated, intermediate the surrounding peripheral flange; and this construction provides against the ready ingress of water to the interior of the junction box, and particularly to the electrical connections which are made with the cores of the cables which enter through the elevated portion of the bottom of the box. The line $a$ in Fig. 1 is intended to illustrate the surface of water rising and filling the manhole or other space in which the junction box may be installed, when the said box is installed in such position that the base plate 2 is lowermost and the flange thereof lies substantially in a horizontal plane. The rising of the water in this manner around my improved junction box will, as soon as it rises above the peripheral flanges which unite the two members 1 and 2 of the junction box, entrap air, not only within the chamber of the junction box itself, but within the dished recess in the bottom of the base plate, 2. The air so entrapped will under those conditions, protect the parts of the structure which are liable to injury by water against inundation, even though the water rises higher. The rising water will, of course, exert pressure, compressing the air entrapped in the spaces referred to, and as the air is compressed, the water will rise in those chambers, but unless the head of water above the junction box shall become very great, the air entrapped in these chambers will prevent the rise of water high enough to cause damage.

It will be observed that, whereas with a flat bottomed box, and particularly a box whose lid is not absolutely air tight, the only way in which to prevent destructive ingress of moisture into the interior of the box and to the electrical connections which it contains is to make a water-tight joint between the lid and base plate of the box and also to make water-tight joints between the cables and the junction box walls at the points where the cables pass through those walls, my improvement enables me to dispense with such packing of joints, or at least renders their presence less necessary and important; and, since such joints are both difficult to make and impossible to maintain against deterioration, the value of my improvement in this regard will be appreciated.

Another feature of my invention concerns the adaptation of water-tight junction boxes, formed of cast iron or other magnetic metal, to the reception of single conductors, either stranded or solid, carrying alternating currents. It is well known that, when such conductors are carried separately through the walls of such boxes formed completely of magnetic metal, not only is there an appreciable drain on the current carried by the conductors, but the junction box wall becomes unduly and sometimes destructively heated by hysteresis and eddy current effects. In order to eliminate this undesirable feature and at the same time provide a water-tight box casing to which terminal structure of the character hereinafter described may be attached, I break the continuity of the magnetic metal of which the box is formed at a point adjacent to the orifice through which the conductor passes, and I fill in such break with a body of non-magnetic metal, forming an integral union between said non-magnetic and magnetic metals, so that a rigid water-tight structure is effected. And by the term "integral union," is meant such unions as are effected between two metals by brazing, welding, or otherwise joining them together into a unit structure. In the drawings I have illustrated two embodiments of this feature of my invention. In Figs. 1 and 2 a panel 3 of brass or other non-magnetic material is shown integrally joined to the upwardly dished cast iron base plate 2. An electric welder is preferably employed for uniting the panel 3 to the plate 2. As will be seen, the cable orifices extend through the panel 3 of non-magnetic material.

In Fig. 3 I show a construction of the character and for the purpose described wherein a tapered slot extends from one cable orifice to the other, such slot being filled with an inlay of non-magnetic metal $3^a$, which may be poured therein in molten condition. When thus constructed it will be seen that the molten metal will form a cast weld with the cast iron base plate 2.

It will be observed that in both embodiments of this feature of my invention, an all metal water-tight junction box structure is effected, through the wall of which a single-conductor carrying an alternating current may be led without heating the wall and making a drain on the current, and to which wall such cable may be secured.

I shall now direct particular attention to that part of the structure which is called the terminal. In these junction boxes the end of the cable introduced through an orifice in the wall is stripped of its protecting coatings, that its conducting core may be electrically connected with another conductor; and, to prevent leakage of current to the wall of the junction box and to the cable sheath, as well as for the greater security of the exposed ends of the coatings of the cable from deterioration, they are inclosed and sealed in a casing which is called the terminal. In earlier structures of this character the metal-sheathed cable passes through an orifice in the wall of the junction box without any interposed structure. It is highly desirable that the joint at this point beneath cable sheath and box wall shall be moisture tight, and to this end it has been customary to run solder between the surface of the cable sheath and the metal wall of the junction box at the point where the cable projects through the wall of the box. This is an imperfect means of guarding against the ingress of moisture; and, instead of that, it has been customary in some installations to insert in the opening formed in the wall of the junction box a metallic sleeve or thimble, and to secure the cable sheath to that sleeve or thimble by a wiped solder joint. Such a construction is preferable to the one first described. It, however, is subject to difficulty, and particularly for the following reason. In such installations, even after the connections have been made, it often becomes necessary in changing the installation or repairing it, to manipulate the cables where they approach the junction box, and even to remove the terminal entirely while the cable remains secured within it. These metal-sheathed cables are, it will be understood, flexible to a considerable extent, and manipulation of them means a bending of them. If the cable be firmly held at one point by a wiped solder joint, the bending of it to any considerable extent will, unless means of prevention are employed, result in breaking the sheath at the point where the solder joint holds the sheath inflexible. In such installations therefore the wiped solder joint becomes a point of weakness, when the serviceableness of the junction box under ordinary practical conditions is considered. In order to prevent such a breaking of the cable sheath at the wiped soldered joint, I provide means for relieving the strain thereon at the point of such joint. Alternate means to such an end are shown in the drawing, the preferred form being that illustrated in Fig. 4. The lead-sheath cable here passes through the sleeve of the thimble 4 and the wiped joint is made at the inner end of the sleeve, the outer end thereof being bell-shaped, as at 5. It will be seen that the flexure of the cable due to the manipulation thereof will be fully resisted by the surrounding sleeve of the thimble 4, and that no strain will be transmitted to the joint 6. A modification of this form is illustrated in Fig. 8, wherein the soldered joint is made at the inner end of a soft metal portion of the thimble 4, the sleeve of which is somewhat larger in diameter than the cable 7. When said cable is manipulated laterally it abuts against the rounded edge 5 of the thimble 4 so that but a small amount of strain is carried to the joint 6. However such strain as is transmitted to said joint is relieved by the flexibility of the soft metal portion of the thimble 4. In the forms just described, of this feature of my invention, the soldered joint is within and protected by a portion of the terminal structure. In Figs. 7 and 9 are illustrated modifications wherein such joint is made without the terminal structure and is unprotected thereby. In these cases the thimble consists of a body portion 4$^a$ of relatively hard metal, and a sleeve-like extension 4$^b$ of relatively soft metal. The soldered joint is made between the soft metal sleeve 4$^b$ and the sheath, and a rigid support or abutment resisting lateral deflection of the cable is provided within said sleeve. In Fig. 7 such abutment is afforded by the prolongation 5$^a$ of the hard metal thimble 4$^a$, and in Fig. 9 the insulator 14 is prolonged to form an abutment 5$^a$. It will be observed that in each of these forms the manipulation of the cable will cause a distortion or lateral deflection of the soft metal sleeve, and that the major portion of the bending stress will be resisted in each case by the abutment 5$^a$, contained within and surrounded by said sleeve. The stress upon the sheath at the point of the soldered joint will then not be great enough to rupture such sheath.

Another desirable feature in these junction box constructions is that the end of the cable shall be rigidly held at the point where it is introduced through the junction-box wall. Rigidity in this regard is desirable because in many installations very delicate connecting mechanism has to be introduced in the circuit of the electric current within the junction box, and lack of rigidity may to a considerable extent affect the efficiency of such mechanism. Constructions such as have ordinarily been used heretofore, are not entirely satisfactory in this regard. My invention, in that it employs a thimble surrounding and engaging the cable sheath at the point where it passes through the wall of the junction box, is superior, for it admits of a rigid bolting of this thimble to the junction-box wall, and accordingly a secure wiped solder joint may first be made between thimble and cable sheath, and then the thimble may be bolted in place. In this bolting various expedients may be adopted. For example, in Figs. 4, 5 and 9 of the drawings, the thimble, 4, is provided with laterally extended flanges 8, with surfaces which may be clamped by ordinary bolts against the junction-box wall. The introduction of gaskets between these abutting surfaces is, of course, an expedient of common use in this art.

In Fig. 6 the external surface of the thimble is itself threaded and the clamping nuts 9 and 10 inside and outside of the junction-box wall clamp the thimble in place.

In Figs. 7 and 8 the compound thimble is shown, the nature of which I have described, consisting of a hard and a soft metal, commonly brass and lead. The shoulder or the surface 8 which is to abut against the wall of the junction box in clamping the thimble into place will, of course, be formed in the hard metal. The soft metal extension, however, may be prolonged as at 11 to cover this shoulder or surface with the soft metal, and thus form an indestructible gasket, continuous with the wiped solder joint, which when the thimble is clamped in place by being bolted, will make a moisture-tight joint. In this modified construction small protuberances, 12, may be formed in the surface of the soft metal gasket, which when the thimble is bolted in place, being crushed by the clamping pressure, will make the joint still more secure. In these cases also the thimble may be threaded on its outer surface and secured in the orifice by a clamping nut 9.

In Fig. 10 there is shown still another modification of the means for securing the thimble in the orifice of the junction-box wall. There the thimble is provided with a shoulder 8, and is clamped to the junction box wall by a clamping nut 9 engaging the threaded surface of the thimble upon the inside of the junction box. Between the clamping nut 9 and the wall of the junction box, a washer 13, preferably of metal, is introduced, and the contacting surfaces between the clamping nut 9, and the washer 13, form a ball and socket joint which is conveniently accomplished by making these contacting surfaces portions of spheres of like radius. The advantage of such a construction is that small inequalities in the junction-box wall are overcome and a tight seating is effected, where otherwise inequality might cause an insecure joint. Instead of making the nut 9 the clamping member it may be provided with lugs through which it may be bolted to the wall 3. This is shown in Fig. 11.

It is a further desirable feature in these junction box structures, not only that the end of the cable shall be rigidly held in the wall of the junction box, but also that the lead-out from the terminal shall be rigid in relation to the junction box wall, and shall be very definitely located with respect to said wall. In boxes heretofore employed definiteness of location in this regard has been left to the workman who makes installation.

A terminal structure of the general character with which my invention is concerned, consists essentially of three parts. The fundamental element of the terminal is the insulator, which is an essentially ring-like body of insulating material surrounding the otherwise exposed end of the cable. This insulator is at one end connected with what is called the lead-out, the lead-out being merely a plug of conducting material, ordinarily copper, filling the end of the insulator, making moisture proof engagement with it all around, electrically connected with the cable core inside, and shaped externally to receive the desired electrical connection. The third member is the thimble already described. Its purpose in the structure is to fill up and make a moisture proof engagement with the opposite end of the insulator, and in turn to be joined to or united with the cable sheath.

My invention in this regard consists in a terminal structure made up of the three elements which I have described, and which is adapted to be securely bolted in the junction-box wall, the parts employed in building the terminal being of definite and predetermined dimension.—Not only is the lead-out securely and rigidly held in place, but its distance from the junction box wall is capable of absolute determination. This is important in many instances where delicate adjustment of connections is essential to the best service of the structure. Referring for further particularity in this regard to the drawings, it will be seen that the terminal shown in Figs. 4 and 5 consists of the ring-like insulator, 14, the lead-out, 15, and the thimble 4, the lead-out, 15, and the thimble, 4, being securely mounted at opposite ends of the insulator, 14, the lead-out, 15, being in electrical connection with the cable core, 16, inside of the insulator and the thimble, 4, being joined with the sheath of cable 3, by the wiped solder joint, 6. In Fig. 4 the thimble 4 has two parts one of which is a screw-threaded sleeve 18. The specific means of securing the lead-out, 15, in moisture-proof engagement with the insulator, 14, does not require a detailed description, for it forms no part of the present invention. In Fig. 4, a nut, 17, screwed down upon the lead-out, 15, binds upon the upper surface of the insulator. In Fig. 5 the insulator is itself screw threaded to receive the lead-out. Further, it is desirable (and this forms another feature of my invention) to have the lead-out not only definitely positioned with respect to the junction box wall, but to have its position capable of some adjustment.

In Fig. 6 I have shown a means for effecting an adjustment of the lead-out by adjusting the position of the terminal as a whole with relation to the junction box wall. The thimble 4 is screw threaded exteriorly and is clamped to the wall of the junction box by means of two nuts 9 and 10. With such construction it is obvious that the specific distance that the lead-out is located from the wall of the box may be accurately adjusted.

A further feature of my invention is that I may so proportion and arrange the parts of the terminal that the terminal may first be formed complete upon the end of the cable; and, when completed, it may be introduced in the orifice in the junction-box wall prepared to receive it, and there bolted in place. This feature is illustrated in all the figures, the terminal structure is of a general cylindrical form, and the orifice in the wall of the box is sufficiently large to allow this cylinder to slip to place. However, at one point, preferably upon the thimble, a lateral extension is formed upon the general cylindrical surface, and this extension affords engagement with the junction box wall. The extension may be the integral shoulder 8 of Fig. 4 or the adjustable clamping nut 10 of Fig. 6. The assembling is readily effected.

Fig. 4 may be referred to for illustration. The end of the cable will first be prepared by stripping away its sheath and then stripping away the insulating envelops, 19, leaving the exposed cable core, 16. The lead-out, 15, will be electrically connected with this core, 16, in well-known manner. The thimble 4, which will first have been slipped over the end of the cable, will then be brought to position, and the wiped solder joint 6 made between it and the cable sheath. When this has been done, the connecting bushing, 18, will be slipped over the lead-out, 15, and secured to the thimble, 4, by the screw thread prepared for that purpose. The insulator, 14, will then be added; or, the insulator, 14, and the bushing, 18, may first have been united, and may be applied together. Finally, the clamping nut, 17, which brings the lead-out, 15, into moisture-proof engagement with the insulator, 14, will be brought to place. Thus the terminal is assembled complete upon the end of the cable. When assembled, it may be introduced in the orifice of the junction box prepared to receive it and bolted there, the lateral projections of the thimble engaging the junction box walls, and the structure may then be bolted in place.

I claim as my invention:

1. A junction box for electrical conductors, which consists of a dished bottom plate with depressed rim and an elevated intermediate portion, and a water-tight cover fitting over said bottom plate and engaging the depressed rim thereof, said bottom plate being provided in its elevated portion intermediate the rim with an orifice for the introduction of an electrical conductor, substantially as described.

2. In an electrical installation, the combination of a junction box formed substantially of magnetic metal and provided with an orifice in its wall for the reception of a cable, a single conductor carrying an alternating current passing through said orifice, a break in the continuity of the magnetic metal of which the said box is formed at a point adjacent said orifice, and a body of non-magnetic metal filling said break and integrally united with said magnetic metal, substantially as described.

3. A junction box for electrical conductors formed substantially of magnetic metal and having two cable orifices in a magnetic-material wall thereof, a slot through such magnetic-material wall extending from one of said orifices to the other, and a body of non-magnetic metal filling said slot and integrally united with said magnetic metal, substantially as described.

4. A junction box for electrical cables provided with a terminal structure carried in an orifice in its wall, such terminal including a thimble engaging both the cable sheath and the junction-box wall and a lead-out connected with said thimble, substantially as described.

5. A terminal structure adapted to be introduced in an orifice in the wall of a junction box, said terminal structure including a thimble adapted to surround a cable to be secured upon the sheath thereof and to be secured in the orifice in the junction-box wall, and a lead-out in structural connection with said thimble, and adapted to be connected electrically with the core of a cable, substantially as described.

6. In a junction box structure, the combination of a junction box, a metal-sheathed cable, an insulator surrounding the end of a cable, a lead-out connected electrically to the end of the cable core and secured to said insulator, and a thimble secured to the cable sheath and to said insulator and further secured in the junction-box wall, substantially as described.

7. In a junction box structure, the combination of a junction box having an orifice in a wall thereof, a lead-sheath cable entering said box through such orifice, a terminal structure secured to said cable and including as a part thereof a rigid abutment resisting lateral deflection of said cable, said thimble also including a soft metal sleeve surrounding and inclosing said abutment and connected to said cable by a wiped soldered joint, substantially as described.

8. In a junction-box structure the combination of a box-wall or casing, a thimble adapted to be secured in an orifice in such junction-box wall, said thimble including an annulus of hard metal provided with a surface arranged to oppose a corresponding surface on the junction-box wall when the thimble is applied to the orifice, and including also a bushing of soft metal adapted to engage and to be united with the sheath of a cable threaded through the thimble, said bushing also extended to constitute a packing upon that surface of the hard metal annulus which, as aforesaid, is arranged to oppose a corresponding surface upon the wall of the junction box, substantially as described.

9. In a junction-box structure for metal-sheathed electrical cables, a cylindrical terminal structure for the cable which is to be introduced, consisting of an annular insulator adapted to surround the end of the cable, a lead-out adapted to be connected electrically with the cable core and to be secured upon one end of the annular insulator, and a thimble adapted to encircle the cable and to be secured to the sheath thereof at a point adjacent to the cable end and also adapted to be secured upon the opposite end of said annular insulator, said thimble protruding externally beyond the general cylindrical surface of the terminal and by such protrusion adapted to engage the wall of the junction box around the periphery of an orifice formed therein of suitable size to permit the introduction of the cylindrical terminal, substantially as described.

In testimony whereof, I have hereunto set my hand.

CHARLES W. DAVIS.

Witnesses:
CHARLES BARNETT,
EDWARD F. MOSER.